United States Patent
Rüffer et al.

(10) Patent No.: US 8,714,941 B2
(45) Date of Patent: May 6, 2014

(54) MOTOR-PUMP ASSEMBLY

(75) Inventors: Manfred Rüffer, Sulzbach (DE); Jens Bacher, Frankfurt am Main (DE); Heinrich Kreh, Florstadt (DE); Lazar Milisic, Kelkheim (DE); Karlheinz Seitz, Lorsch (DE); Harald König, Ober-Mörlen (DE); Michael Kollers, Eschborn (DE); Jose Gonzalez, Oeynhausen (DE); Michael Jürging, Kelkheim (DE); Marcel Niepenberg, Groβ-Gerau (DE); Stephan Krebs, Eschborn (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 334 days.

(21) Appl. No.: 13/139,394

(22) PCT Filed: Dec. 15, 2009

(86) PCT No.: PCT/EP2009/067204
§ 371 (c)(1),
(2), (4) Date: Jul. 28, 2011

(87) PCT Pub. No.: WO2010/069965
PCT Pub. Date: Jun. 24, 2010

(65) Prior Publication Data
US 2011/0277464 A1 Nov. 17, 2011

(30) Foreign Application Priority Data
Dec. 19, 2008 (DE) .......................... 10 2008 064 151
Dec. 10, 2009 (DE) .......................... 10 2009 054 499

(51) Int. Cl.
F04B 25/00 (2006.01)
F04B 17/03 (2006.01)
F04B 39/16 (2006.01)
F04B 39/00 (2006.01)
F04B 45/047 (2006.01)

(52) U.S. Cl.
CPC ............. *F04B 39/16* (2013.01); *F04B 39/0061* (2013.01); *F04B 45/047* (2013.01)
USPC ......... 417/255; 417/312; 417/313; 417/413.1

(58) Field of Classification Search
CPC .... F04B 27/005; F04B 39/16; F04B 39/0061; F04B 45/047; F04B 53/20
USPC ........ 417/255, 312, 313, 413.1; 181/231, 403
See application file for complete search history.

(56) References Cited

U.S. PATENT DOCUMENTS 2,539,896 A * 1/1951 Dalrymple ..................... 417/255
3,877,842 A * 4/1975 Greene et al. ................. 417/312

(Continued)

FOREIGN PATENT DOCUMENTS

DE 102006060645 A1 8/2007
DE 102007005223 A1 9/2007

(Continued)

*Primary Examiner* — Charles Freay
(74) *Attorney, Agent, or Firm* — Brinks Gilson & Lione

(57) ABSTRACT

Disclosed is a motor-pump assembly (1) for a brake actuating device of a motor vehicle brake system with a pneumatic brake booster. An electric motor (3) drives a double diaphragm pump (2) with two working diaphragms (4) which are located opposite one another. Air expelled from the working spaces (7) is directed into an interior space (22) surrounding a crank drive (8) of the pump housing (5). An air outlet unit (23, 53) has a filter housing (32, 54), a filter (33, 59), an air outlet cover (34, 56), a valve holding element (38, 70) and a valve body (31). A partition wall (37, 55) deflects the air emerging from the interior space (22) in the air outlet unit (23, 53 between the filter housing (32, 54) and the air outlet cover (34, 56), with an integrally molded valve holding element (38, 70).

19 Claims, 12 Drawing Sheets

(56) References Cited

U.S. PATENT DOCUMENTS

| | | |
|---|---|---|
| 6,382,931 B1 * | 5/2002 | Czabala et al. ............... 417/312 |
| 2002/0134617 A1 * | 9/2002 | Nissen et al. ................. 181/403 |
| 2003/0103843 A1 | 6/2003 | Seo |
| 2010/0202893 A1 * | 8/2010 | Bacher et al. ................ 417/44.2 |

FOREIGN PATENT DOCUMENTS

| | | |
|---|---|---|
| DE | 102007020538 A1 | 10/2008 |
| DE | 102008005820 A1 | 3/2009 |

* cited by examiner

MOTOR-PUMP ASSEMBLY

TECHNICAL FIELD OF THE INVENTION

The invention relates to a motor-pump assembly for a motor vehicle brake system.

BACKGROUND OF THE INVENTION

In order to make available a vacuum for a pneumatic brake booster whose interior space is divided into at least one vacuum chamber and one working chamber, vacuum pumps are used which suck in residual air from the vacuum chamber and discharge it into the atmosphere. Vane-type pumps or pivoting vane pumps are generally used for this purpose in the automobile industry. Said pumps have, due to the principles involved, a large amount of friction and have to be lubricated in order to achieve an acceptable service life. Vacuum pumps which are driven by the internal combustion engine of the motor vehicle and have vanes are therefore connected to the oil circuit of the internal combustion engine. Nevertheless, an appreciable portion of the power which is output by the internal combustion engine has to be used to drive such a pump. And this is the case even when the vacuum in the chamber which is to be evacuated is already fully formed. For this reason it is appropriate to operate the vacuum pump with electrical energy and to switch it on only when the absolute pressure in the vacuum chamber rises above a predetermined value.

Furthermore, in vehicles with an electric drive or hybrid drive, the vacuum pump cannot be driven, or at certain times cannot be driven, by the internal combustion engine. For this reason, electrically driven vacuum pumps are used in these vehicles.

Equipping such an electrically driven pump with a lubricant circuit or connecting such a pump to such a circuit would mean an unacceptably high expenditure. As a result, only dry-running vacuum pumps are possible for use in motor vehicles with brake systems with an electrically driven vacuum pump. In vane-type pumps, the self-lubricating material graphite is used for this, the vanes being manufactured from graphite with the necessary precision at high cost. For this reason, efforts have been made to use a diaphragm pump for electrically supplying a braking vacuum.

A motor-pump assembly of the generic type is known, for example, from DE 10 2007 005 223 A1, wherein the outlet ducts of the motor-pump assembly are arranged in the working space covers and in the pump housing in such a way that air which is expelled from the working spaces is conducted into an interior space, surrounding the crank drive, of the pump housing, and wherein an air outlet unit is provided which permits low-noise expulsion of the air from the interior space by deflecting the air. The interior space, also referred to as the crank space, therefore serves as a sound damping space since the expelled air is not conducted directly into the atmosphere. Deflecting the air in the air outlet unit allows the noise level to be additionally significantly reduced, with the result that expulsion noises are virtually avoided completely. The air outlet unit comprises a filter housing, at least one filter, an air outlet cover, a valve holding element and a valve body, and is provided as a pre-mountable assembly. The discharged air is prevented from flowing back by virtue of the fact that the filter housing, the valve holding element and the valve body form a nonreturn valve.

SUMMARY OF THE INVENTION

Efforts are always being made to reduce the manufacturing costs and the expenditure on mounting. For this reason, the object of the present invention is to make available a low-noise, cost-reduced motor-pump assembly which requires reduced expenditure on mounting compared to the known assembly of the generic type. In addition, the number of components is to be reduced.

The object is achieved according to the invention in that a partition wall, which deflects the air emerging from the interior space in the air outlet unit, is provided between the filter housing and the air outlet cover, and in that the valve holding element is integrally molded on the partition wall. As a result, the mounting of the air inlet unit can be significantly simplified and the number of components can be reduced.

Further features, advantages and application possibilities of the invention emerge from the following description of exemplary embodiments and on the basis of the drawing.

DETAILED DESCRIPTION OF THE DRAWINGS

Figure 1:
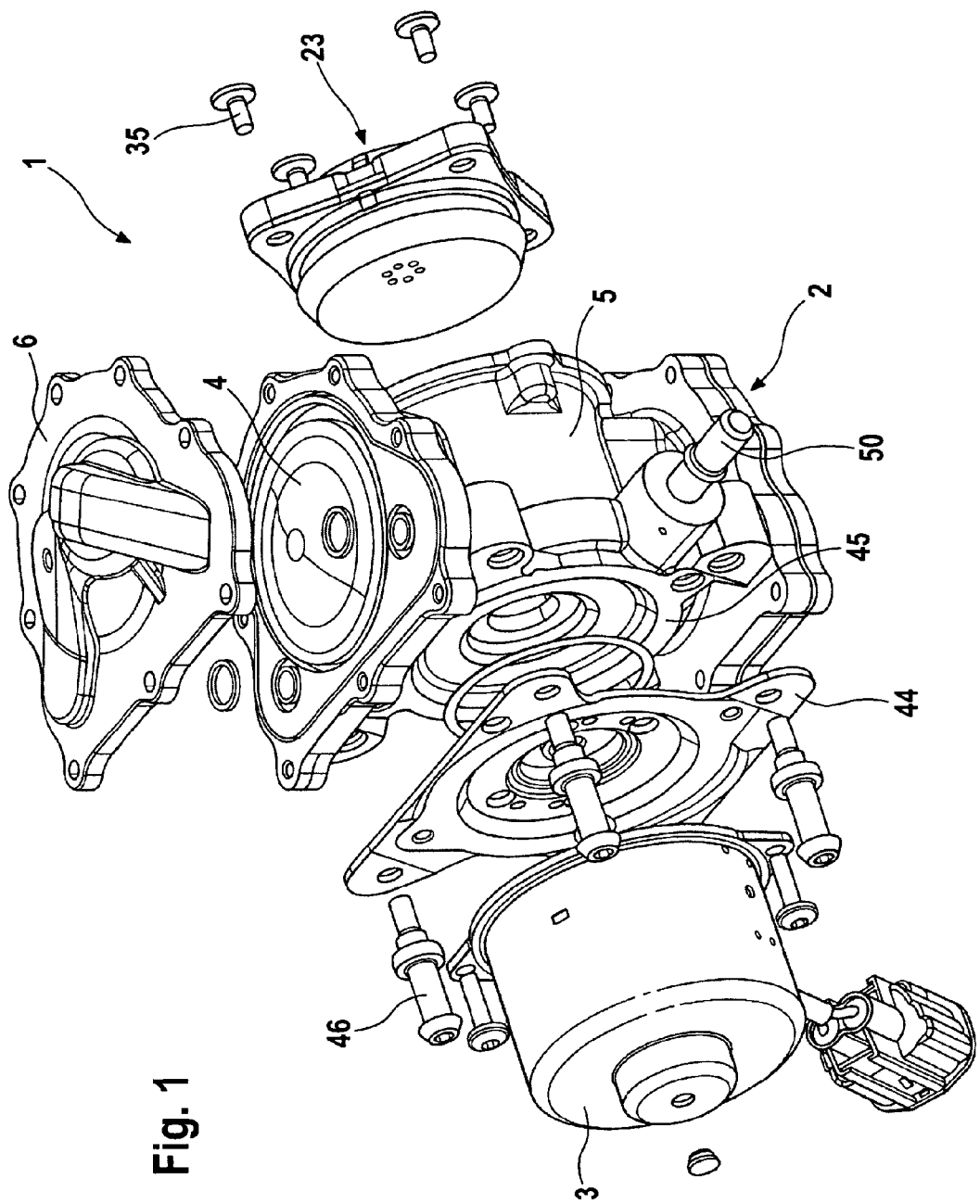
FIG. 1 shows a first exemplary embodiment of a motor-pump assembly according to the invention in a spatial illustration.

FIG. 1 shows a motor-pump assembly 1 according to the invention in an exploded illustration, which motor-pump assembly 1 comprises a pump 2 with a pump housing 5 and an electric motor 3 which drives the pump, wherein the motor 3 can be embodied, for example, as a direct current motor.

Figure 2:
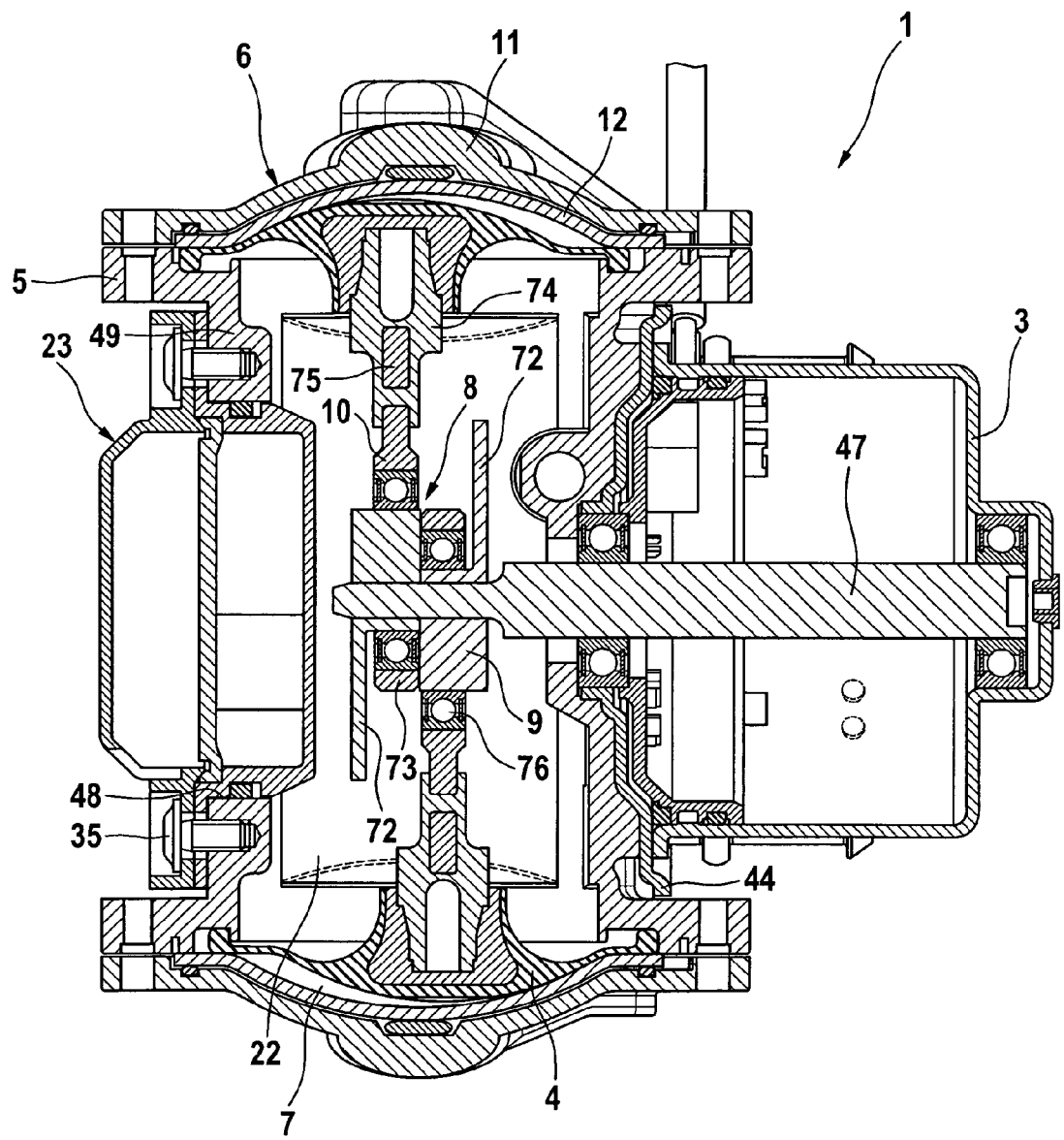
FIG. 2 shows the motor-pump assembly according to FIG. 1 in a longitudinal section through a first plane.

The pump 2 is, as is apparent in particular from the sectional illustration according to FIG. 2, provided as a double diaphragm pump with two working diaphragms 4 which are located opposite one another and are each clamped in between the pump housing 5 and a working space cover 6 and as a result bound a working space 7. The working diaphragms 4 can be moved in opposite directions by means of a crank drive 8, which comprises an eccentric 9 and a connecting rod 10 per working diaphragm 4.

Figure 3:
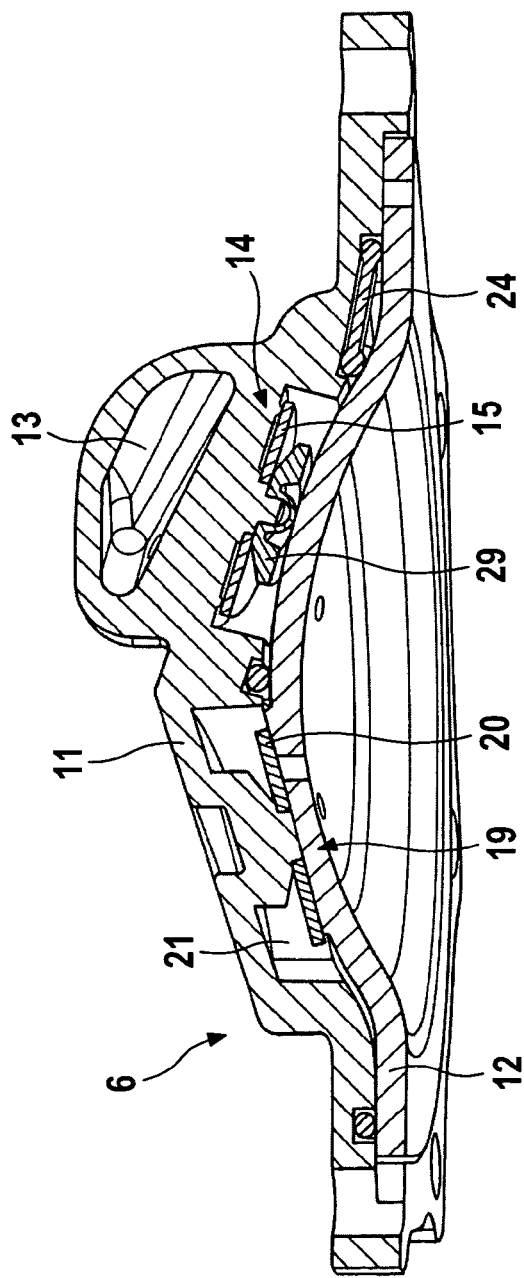
FIG. 3 shows the working space cover according to FIG. 1 in a longitudinal section through a second plane.

The working space cover 6 which is shown in a sectional illustration in FIG. 3 has an upper cover 11 and a lower cover 12, which are welded, riveted or screwed to one another in an airtight fashion. In order to reduce costs, the upper cover 11 is provided from plastic, and the lower cover 12 is embodied as a punched part. An alternative which is also cost-effective provides that the lower cover 12 is manufactured by means of aluminum die casting. It is also possible to embody the lower cover 12 as a sintered part.

Figure 4:
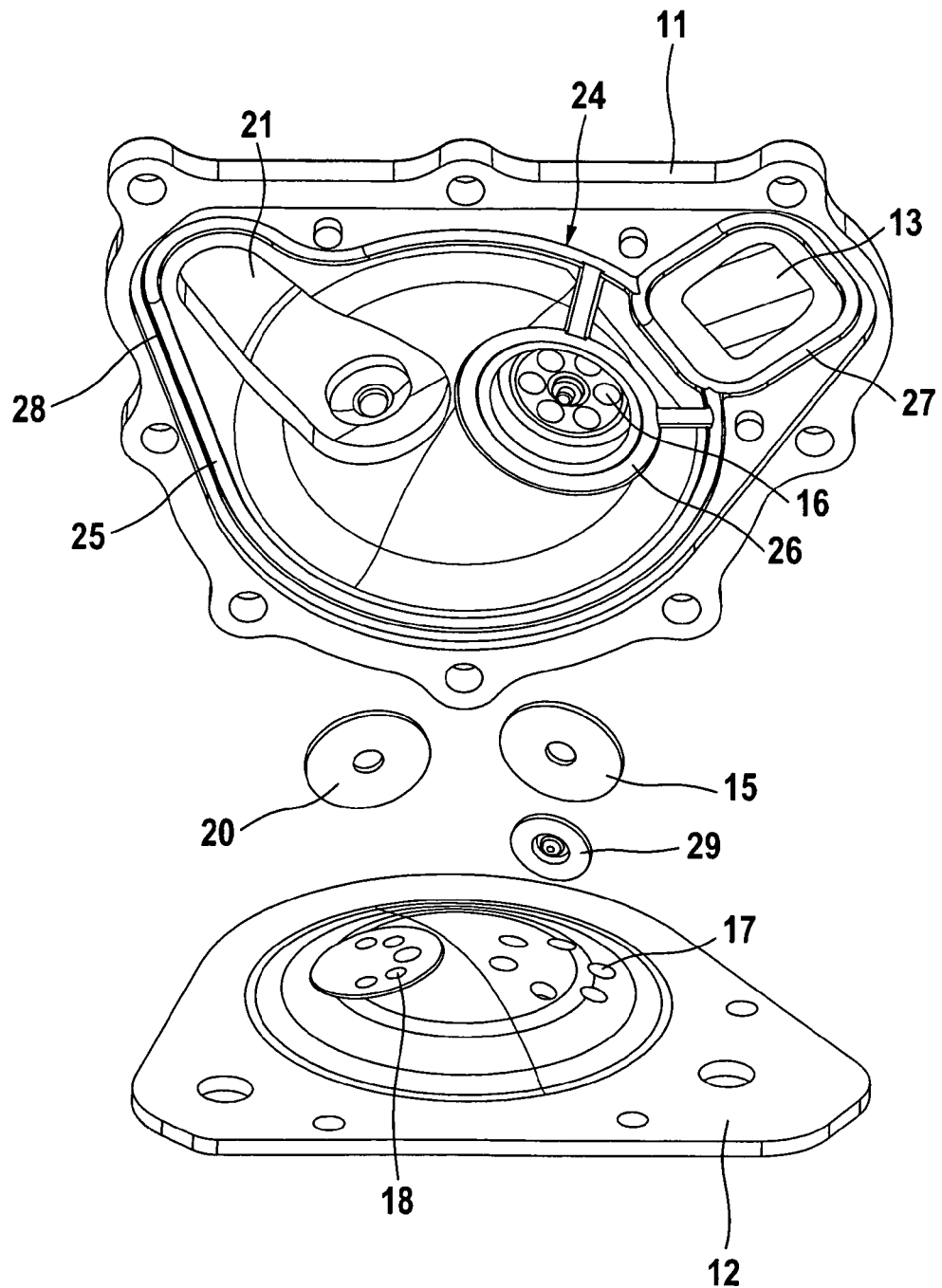
FIG. 4 shows individual parts of the working space cover according to FIG. 3 in a spatial view.

An inlet duct 13, which is molded in the upper cover 11, is connected in an airtight fashion to ducts in the pump housing 5 by means of a seal-forming element and passes on the sucked-in air to an inlet valve 14, is provided in each of the working space covers 6. The inlet valve 14 is embodied as a plate valve with a valve disk 15 made of elastic material. In this respect, it is apparent from FIG. 4, which illustrates the individual parts of the working space cover 6 in a spatial view, that the overall passage surface which is to be covered by the elastomer valve disk 15 is expediently divided here into multiple small passage surfaces each with a circular cross section. For this, the inlet duct 13 in the upper cover 11 branches into a corresponding number of individual ducts 16, which are arranged in a circular shape about a central axis of the inlet valve 14. The passage surface of the inlet valve 14 is utilized for this.

After the sucked-in air has flowed through the inlet valve 14, it passes, via working space cover openings 17 in the lower cover 12, into the working space 7 between the diaphragm 4 and working space cover 6, is compressed there and is conducted via further working space cover openings 18 to the outlet valve 19, which is also embodied as a plate valve with a valve disk 20 made of an elastomer material. As is apparent, an outlet duct 21 is molded between the upper cover 11 and the lower cover 12.

The discharged air is conducted from the outlet valve 19 via the outlet duct 21 in the working space cover 6 to an outlet duct (not illustrated) in the pump housing 5. The outlet ducts 21 in the working space cover 6 and in the pump housing 5 are connected in an airtight fashion by means of a seal-forming element. The two outlet ducts in the pump housing 5 open into an interior space 22 of the pump housing 5, referred to as the crank space, which surrounds the crank drive 8.

An air outlet valve unit 23, which is provided in the pump housing 5 and which is described in yet more detail below, permits low-noise expulsion of the air from the interior space 22. The interior space 22 therefore serves as a sound damping space.

Figure 5:
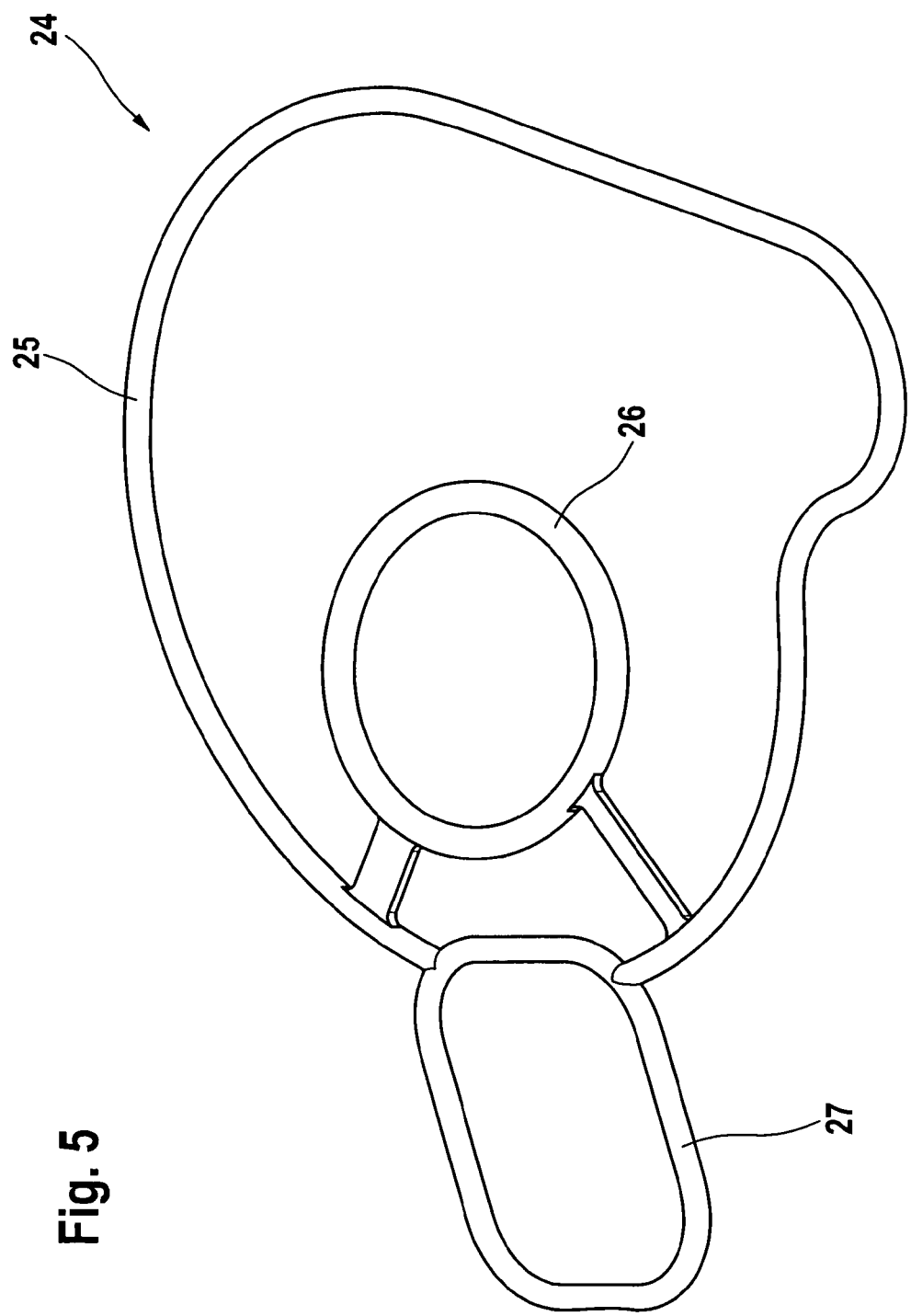
FIG. 5 shows a molded seal of the working space cover according to FIGS. 3 and 4.

For the purpose of forming a seal, a molded seal 24 (illustrated in FIG. 5) is provided between the upper cover 11 and the lower cover 12, which molded seal 24 has a plurality of seal-forming elements 25, 26, 27 for sealing the different regions between the two components 11, 12, and can be positioned in a corresponding recess 28 in the upper cover 11. As a result of the connection of the individual seal-forming elements 25-27 to the molded seal 24, the mounting can be substantially simplified and the manufacturing costs can be reduced. Furthermore, the number of individual components is reduced.

A holding element 29 in the region of the inlet valve 14 holds the valve disk 15 on the upper cover 11 and at the same time ensures that the working space dead space is reduced. As a result, the vacuum can be increased by approximately 5%.

Figure 6:
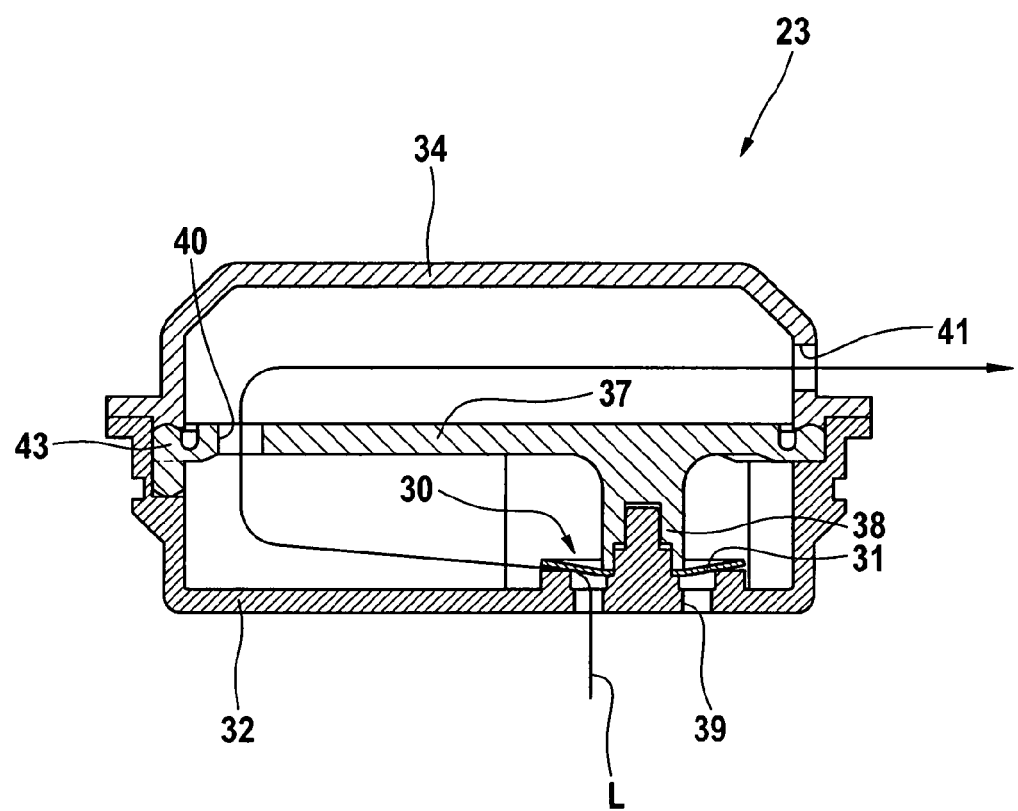
FIG. 6 shows an air outlet unit of the motor-pump assembly according to FIG. 1 in a longitudinal section.

The air outlet unit 23 which is shown in a sectional view in FIG. 6 comprises a nonreturn valve 30 comprising a single-component or multi-component valve body 31 which prevents air which has already been discharged from flowing back and prevents liquid or gaseous substances from penetrating the interior space 22.

Figure 7:
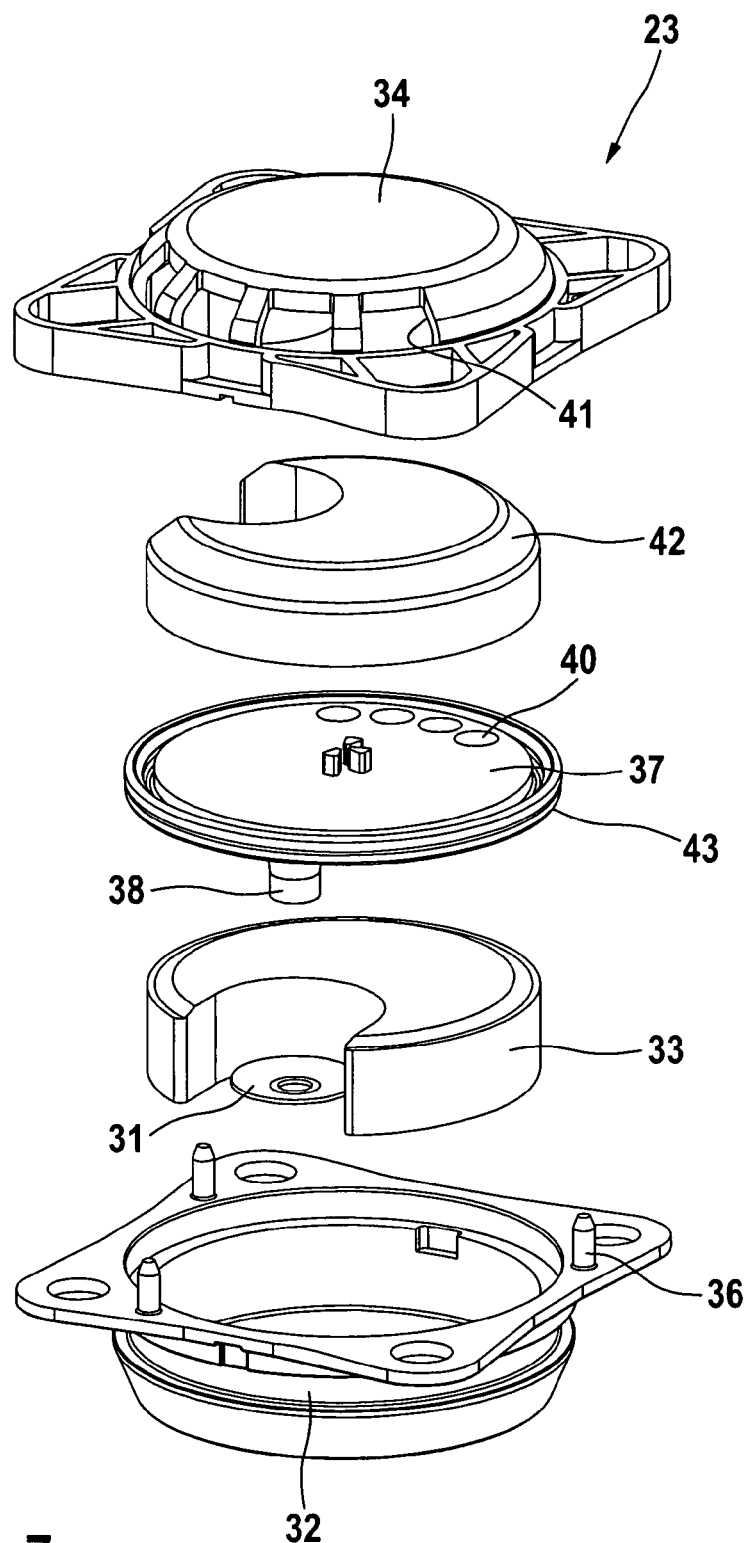
FIG. 7 shows the air outlet unit according to FIG. 6 in an exploded illustration.

In addition, the air-borne sound when the air exits the interior space 22 is reduced by virtue of the fact that the air outlet unit 23 which is illustrated in an exploded drawing in FIG. 7 has a filter 33 which is arranged in a filter housing 32.

Furthermore, the air outlet unit 23 comprises an air outlet cover 34, a valve holding element 38 and the valve body 31, and can be provided as a pre-mountable assembly. The air outlet cover 34 and the filter housing 32 are attached by screw elements 35 to the pump housing 5, as is apparent from FIGS. 1 and 2. The filter housing 32 is riveted to the air outlet cover 34. For this purpose, the filter housing 32 has a plurality of pins 36, and the air outlet cover 34 has corresponding drill holes (not visible).

A partition wall 37 between the filter housing 32 and the air outlet cover 34 serves to deflect the air stream L in the air outlet unit 23, as illustrated in FIG. 6.

If the air pressure in the interior space 22 of the pump 2 is higher than the atmospheric pressure surrounding the pump 2, the nonreturn valve 30 opens by virtue of the fact that the valve body 31 at least partially lifts off from openings 39 in the filter housing 32, and the air flows through the filter 33 in the direction of the atmosphere.

For this purpose, the partition wall 37 has openings 40. The air firstly passes through the openings 39 in the filter housing 32. The openings 40 in the partition wall 37 are positioned in such a way that the air is firstly deflected by 90° and then by 180° until it exits openings 41 in the air outlet cover 34. This deflection of air can significantly reduce the noise level.

The partition wall 37 can easily be integrated into the air outlet unit 23 and forms part of the pre-mountable structural unit. The filter 33 is arranged between the filter housing 32 and the partition wall 37. A further filter 42 is provided between the air outlet cover 34 and the partition wall 37. The air-borne sound is therefore damped both before the deflection and thereafter in the air outlet unit 23.

Furthermore, it is apparent from FIG. 6 that the valve holding element 38 is integrally molded onto the partition wall 37, as result of which the number of components and the expenditure on mounting are further reduced significantly.

A molded-on seal-forming element 43, which is provided on the partition wall 37 for the purpose of sealing the air outlet unit 23, amplifies the effect of the reduction in the number of components further.

In a further exemplary embodiment (not illustrated), there is provision, for the purpose of reducing the number of components further, that the valve body 31 is also integrally molded onto the partition wall 37 or onto the valve holding element 38.

The partition wall 37 is advantageously manufactured in a cost-effective and easy way from EPDM (ethylene propylene diene rubber).

Figure 8:
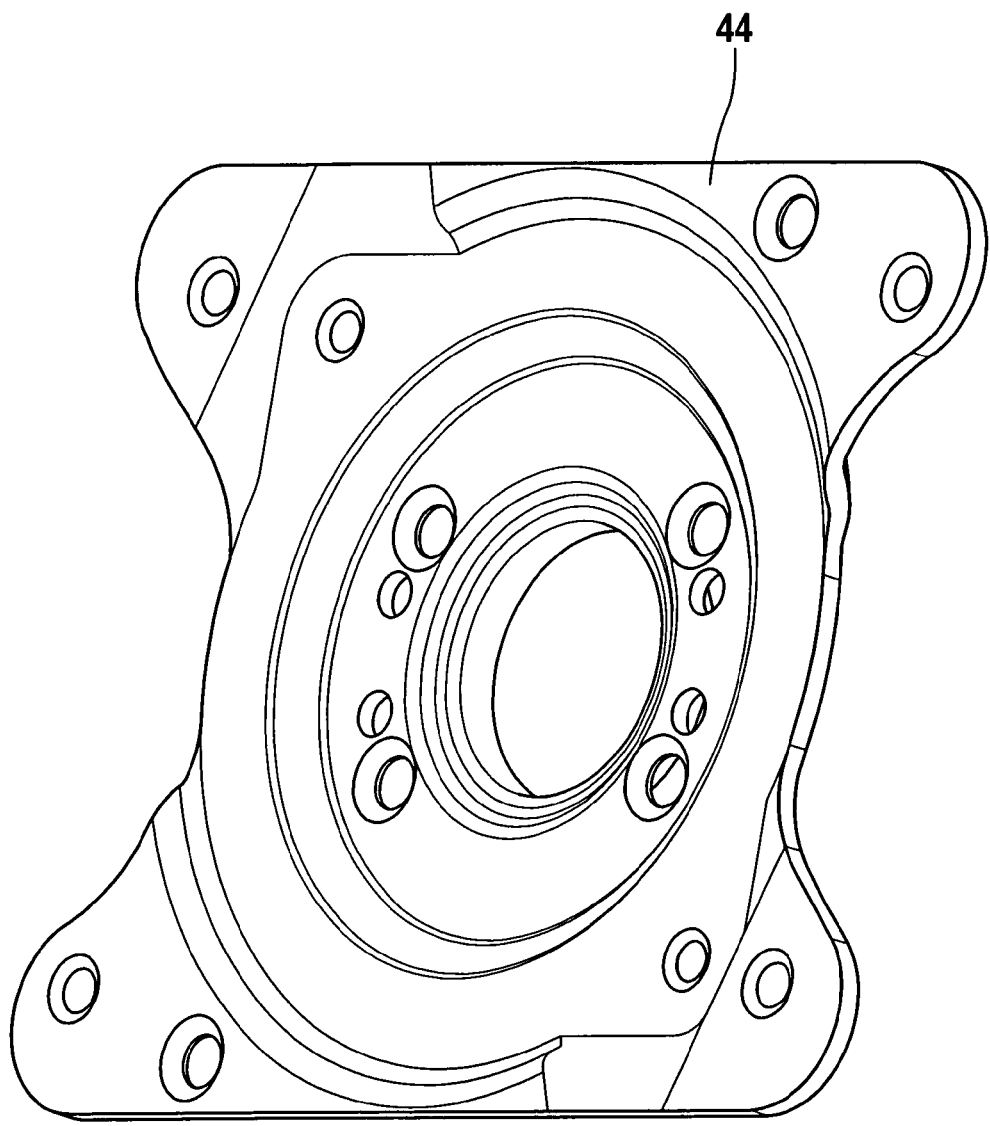
FIG. 8 shows a motor shield of the motor-pump assembly according to FIG. 1 in a spatial illustration.

The pump housing 5 is provided from plastic, permitting cost-effective manufacture. As is apparent from FIGS. 1 and 2, a motor shield 44 (illustrated in FIG. 8) is arranged between the motor 3 and the pump housing 5, is attached to a motor flange side 45 of the pump housing 5 and blocks EMC radiation which is output by the motor 3.

The motor 3 and the motor shield 44 are attached to the pump housing 5 by means of screw elements 46 which are screwed directly into the pump housing 5.

For attaching the motor-pump assembly 1 in the vehicle, the motor shield 44 can have holding elements (not shown).

In addition, from FIG. 2 it is apparent that a motor shaft 47 serves simultaneously in this exemplary embodiment as an eccentric shaft which bears the crank drive 8 with the eccentrics 9 and the connecting rods 10.

However, a separate embodiment of the motor shaft and eccentric shaft is also possible.

The air outlet unit 23 described above is provided for installation in a breakthrough 48 in a wall 49, facing away from the motor 3, of the pump housing 5. In this context, the breakthrough 48 performs, before the insertion of the air outlet unit 23, the function of a mounting window which permits access to the interior space 22 of the pump housing 5.

In addition, a connection 50 (shown in FIG. 1) via, for example, a connected brake booster is evacuated, is provided on the pump housing 5.

Figure 9:
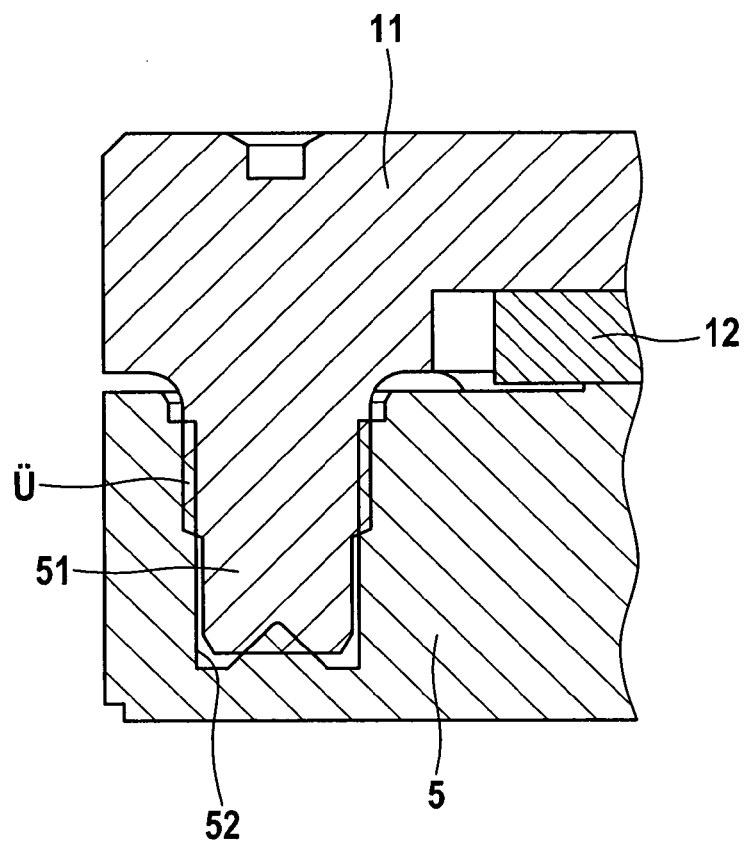
FIG. 9 shows an enlarged detail of the pump according to FIG. 1.

FIG. 9 shows a detail of the pump 2 of the motor-pump assembly 1 in section. As is apparent, the upper cover 11 has, for the attachment of the working space cover 6 to the pump housing 5, welding projections 51 which engage by a protruding distance Ü in corresponding recesses 52 in the pump housing 5. The welding projections 51 and the pump housing 5 are softened or fused on in a punctiform fashion by means of ultrasound, with the result that a secure connection is produced between the two components 11, 5.

From FIG. 2 it is also clear that, in order to optimize oscillations, in each case an unbalanced weight 72 is integrally molded onto the eccentrics 9, wherein the eccentrics 9 are manufactured as sintered components. This embodiment of the eccentrics 9 brings about, on the one hand, cost-effective manufacture and simplified mounting, since the mounting of the unbalanced weights 72 on the eccentrics 9 can be dispensed with through screwing, welding, etc., and on the other hand said embodiment of the eccentrics 9 brings about a further reduction in the number of components.

In order to optimize costs further, connecting eyelets 73 of the connecting rods 10 are provided as sintered components and connecting rod shanks 74 made of plastic are provided, wherein the attachment of the connecting rod shank 74 to the connecting eyelet 75 is carried out by encapsulating an extension 75 of the connecting eyelet 73 by injection molding. The working diaphragm 4 can easily be attached to the connecting rod shank 74 by friction welding. Ball bearings 76 are pressed into the connecting eyelets 73.

Figure 10:
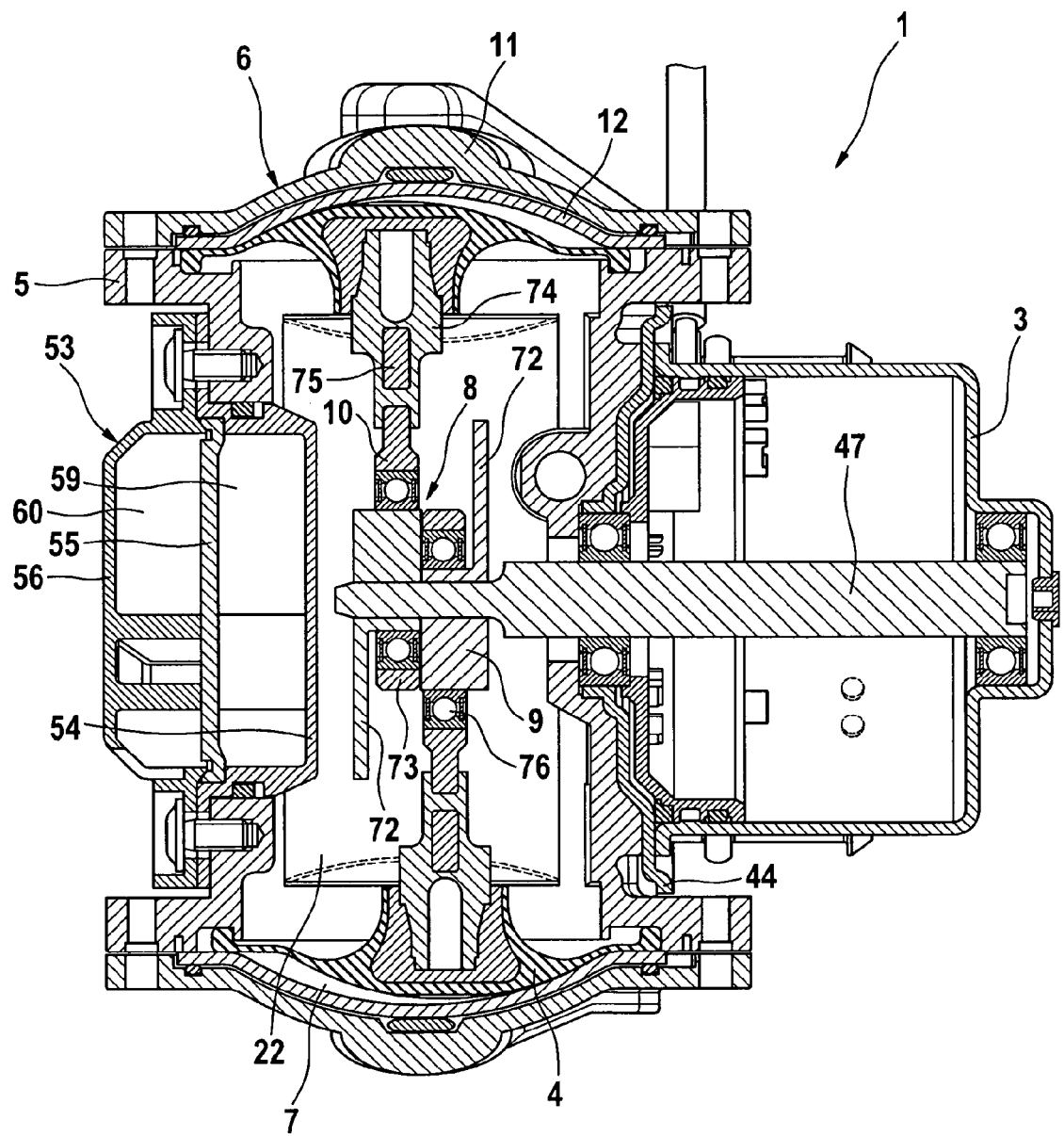
FIG. 10 shows a second exemplary embodiment of a motor-pump assembly according to the invention in a spatial illustration.

A second exemplary embodiment of a motor-pump assembly 1 according to the invention can be seen in FIG. 10. The function and essential design do not differ from the first exemplary embodiment, and therefore details will only be given below on the differences. Identical components are provided with identical reference numbers.

Figure 11:
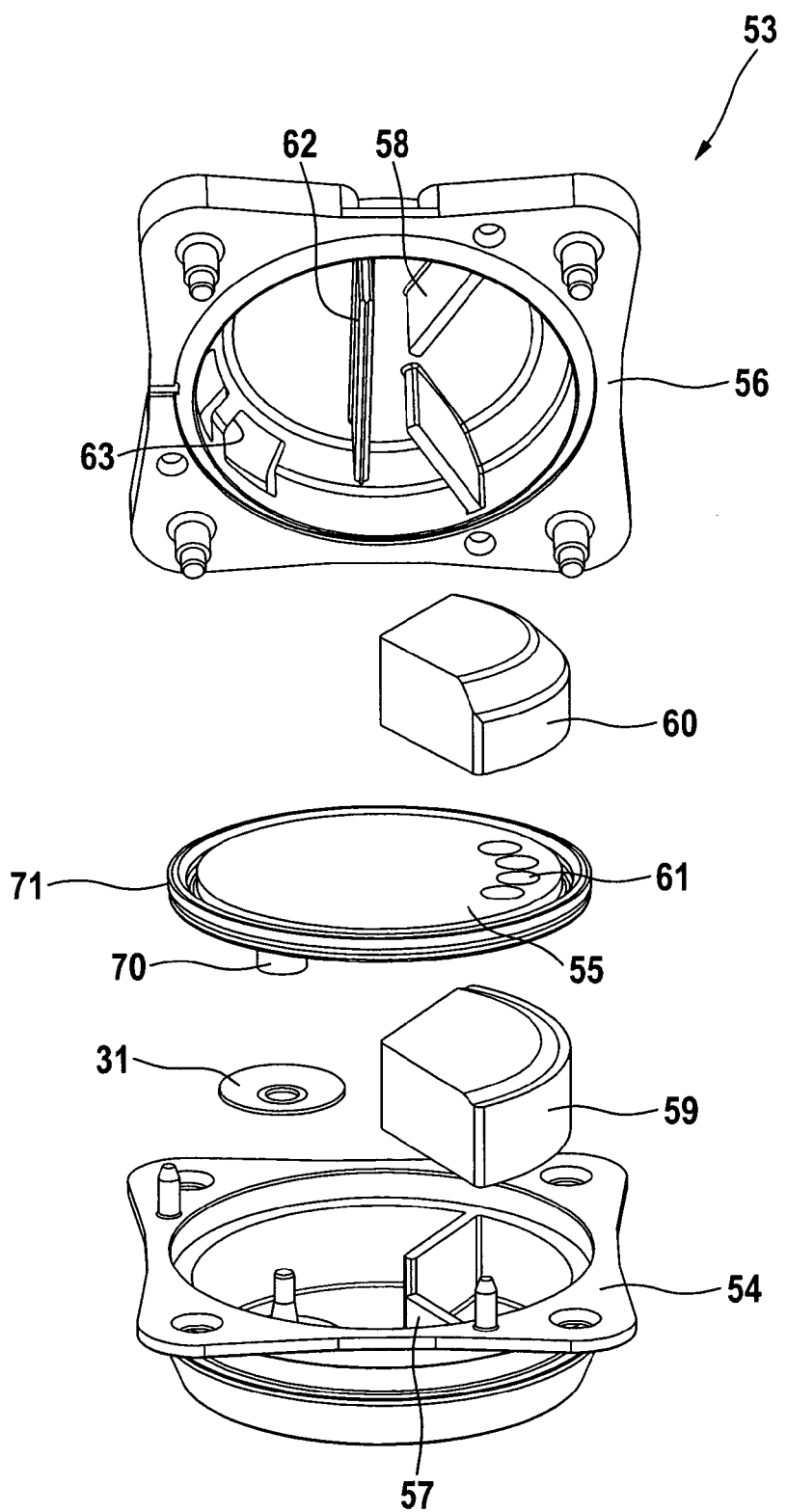
FIG. 11 shows the air outlet unit of the motor-pump assembly according to FIG. 10 in an exploded view.

The second exemplary embodiment has an improved air outlet unit 53 which, as has also been described with respect to the first exemplary embodiment, comprises a nonreturn valve with a valve body 31. Furthermore, the air outlet unit 53 which is illustrated as an exploded drawing in FIG. 11 also has a filter housing 54, an partition wall 55 with molded-on valve holding element 70 and molded-on seal-forming element 71 and an air outlet cover 56, which basically correspond to the components of the filter housing 32, partition wall 37 and air outlet cover 34.

In contrast to this, ribs 57, 58, which position filters 59, 60 in the region of openings 61 in the partition wall 55, are provided in the filter housing 54 and in the air outlet cover 56. This makes it possible to significantly reduce the size of the filters 59, 60 in contrast to the filters 31 and 42 in the first exemplary embodiment.

In addition, a surge protection wall 62 is arranged in the air outlet cover 56, which surge protection wall 62 makes it difficult for fluid to enter the pump 2 through openings 63 in the air outlet cover 56.

Figure 12:
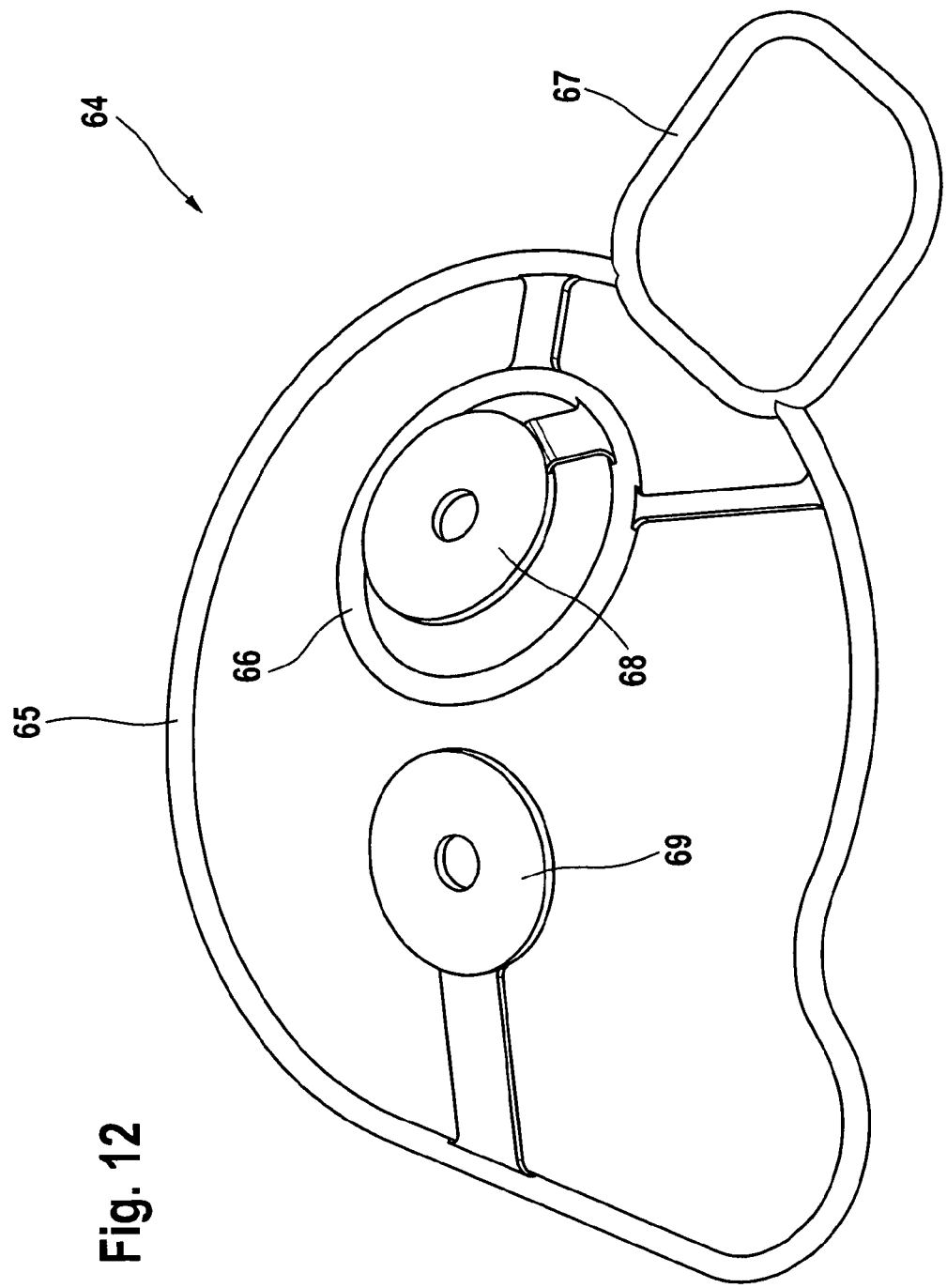
FIG. 12 shows a molded seal of the motor-pump assembly according to FIG. 10 in a spatial illustration.

A further difference is that a molded seal 64, which is provided for sealing the upper cover 11 and lower cover 12 and is illustrated in FIG. 12, has not only seal-forming elements 65, 66, 67 but also valve disks 68, 69 for the inlet and the outlet valve 14, 19, with the result that mounting can be simplified even further and the number of components can be reduced even further.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A motor-pump assembly for providing pressure for a brake actuating device of a motor vehicle brake system having a pneumatic brake booster, comprising
    a double diaphragm pump with a first and a second working diaphragm opposite one another; the first working diaphragm being clamped in between a pump housing and a first working space cover and as a result bounding a first working space, and the second working diaphragm being clamped in between the pump housing and a second working space cover and as a result bounding a second working space;
    an electric motor driving a crank drive having a corresponding eccentric and connecting rod acting on each of the first and second working diaphragms;
    a first inlet duct with a first inlet valve assigned to the first working space;
    a second inlet duct with a second inlet valve assigned to the second working space;
    a first outlet duct with a first outlet valve assigned to the first working space,
    a second outlet duct with a second outlet valve assigned to the second working space,
    the first and second outlet ducts guiding air expelled from the first and second working spaces into an interior space of the pump housing surrounding the crank drive; and
    an air outlet unit for releasing the expelled air from the interior space, with a filter housing, a filter, an air outlet cover, a valve body, and a partition wall between the filter housing and the air outlet cover, the partition wall deflecting the expelled air emerging from the interior space in the air outlet unit;
    wherein the partition wall further comprises a seal-forming element which is molded on the circumference of the partition wall for the purpose of sealing the air outlet unit.

2. The motor-pump assembly as claimed in claim 1, wherein the partition wall is manufactured from ethylene propylene diene rubber.

3. The motor-pump assembly as claimed in claim 1, wherein the filter is arranged between the filter housing and the partition wall and a further filter is arranged between the air outlet cover and the partition wall.

4. The motor-pump assembly as claimed in claim 1, further comprising ribs in the filter housing and in the air outlet cover, the ribs positioning the filter in the region of openings in the partition wall.

5. The motor-pump assembly as claimed in claim 1, the air outlet cover further comprising at least one surge protection wall.

6. The motor-pump assembly as claimed in claim 1, wherein the pump housing is made of plastic, and a motor shield is attached between the pump housing and the motor.

7. The motor-pump assembly as claimed in claim 6, the motor shield comprising holding elements for mounting the motor-pump assembly.

8. The motor-pump assembly as claimed in claim 1, wherein at least one of the first and second working space covers comprises an upper cover and a lower cover which are connected to one another in a seal-forming fashion, wherein the assigned inlet valve and the assigned outlet valve are arranged between the upper cover and the lower cover, the upper cover being molded from plastic and the lower cover being a punched part or as a sintered part or is a die-cast aluminum part.

9. The motor-pump assembly as claimed in claim 8, the upper cover comprising a plurality of welding projections which engage by a protruding distance in corresponding recesses in the pump housing, wherein the upper cover and the pump housing are welded to one another by means of ultrasonic welding.

10. The motor-pump assembly as claimed in claim 1, wherein the working space covers are welded to the pump housing.

11. The motor-pump assembly as claimed in claim 1, wherein each of the eccentrics is a sintered component and has an unbalance weight integrally molded onto the eccentric.

12. The motor pump assembly as claimed in claim 1, wherein the air outlet unit further comprises a valve body and the partition wall further comprises a valve holding element integrally molded thereon.

13. The motor-pump assembly as claimed in claim 12, wherein the valve body is integrally molded on the valve holding element.

14. The motor-pump assembly as claimed in claim 12, wherein the pump housing is made of plastic, and a motor shield is attached between the pump housing and the motor, the motor shield comprising holding elements for mounting the motor-pump assembly.

15. The motor-pump assembly as claimed in claim 12, further comprising ribs in the filter housing and in the air outlet cover, the ribs positioning the filter in the region of openings in the partition wall.

16. A motor-pump assembly for providing pressure for a brake actuating device of a motor vehicle brake system having a pneumatic brake booster, comprising
a double diaphragm pump with a first and a second working diaphragm opposite one another; the first working diaphragm being clamped in between a pump housing and a first working space cover and as a result bounding a first working space, and the second working diaphragm being clamped in between the pump housing and a second working space cover and as a result bounding a second working space;
an electric motor driving a crank drive having a corresponding eccentric and connecting rod acting on each of the first and second working diaphragms;
a first inlet duct with a first inlet valve assigned to the first working space;
a second inlet duct with a second inlet valve assigned to the second working space;
a first outlet duct with a first outlet valve assigned to the first working space,
a second outlet duct with a second outlet valve assigned to the second working space,
the first and second outlet ducts guiding air expelled from the first and second working spaces into an interior space of the pump housing surrounding the crank drive;
wherein at least one of the first and second working space covers comprises an upper cover and a lower cover which are connected to one another in a seal-forming fashion, wherein the assigned inlet valve and the assigned outlet valve are arranged between the upper cover and the lower cover, the upper cover being molded from plastic and the lower cover being a punched part or as a sintered part or is a die-cast aluminum part;
a molded seal with a plurality of seal-forming elements between the upper cover and the lower cover; and
an air outlet unit for releasing the expelled air from the interior space, with a filter housing, a filter, an air outlet cover, a valve body, and a partition wall between the filter housing and the air outlet cover with a valve holding element integrally molded on the partition wall, the partition wall deflecting the expelled air emerging from the interior space in the air outlet unit.

17. The motor-pump assembly as claimed in claim 16, further comprising valve disks of the inlet valves and outlet valves molded onto the molded seal.

18. The motor-pump assembly as claimed in claim 16, further comprising a holding element for the valve disk of the inlet valve, the holding element being arranged between the lower cover and the upper cover.

19. A motor-pump assembly for providing pressure for a brake actuating device of a motor vehicle brake system having a pneumatic brake booster, comprising
a double diaphragm pump with a first and a second working diaphragm opposite one another; the first working diaphragm being clamped in between a pump housing and a first working space cover and as a result bounding a first working space, and the second working diaphragm being clamped in between the pump housing and a second working space cover and as a result bounding a second working space;
an electric motor driving a crank drive having a corresponding eccentric and connecting rod acting on each of the first and second working diaphragms;
a first inlet duct with a first inlet valve assigned to the first working space;
a second inlet duct with a second inlet valve assigned to the second working space;
a first outlet duct with a first outlet valve assigned to the first working space,
a second outlet duct with a second outlet valve assigned to the second working space,
the first and second outlet ducts guiding air expelled from the first and second working spaces into an interior space of the pump housing surrounding the crank drive; and
an air outlet unit for releasing the expelled air from the interior space, with a filter housing, a filter, an air outlet cover, a valve body, and a partition wall between the filter housing and the air outlet cover with a valve holding element integrally molded on the partition wall, the partition wall deflecting the expelled air emerging from the interior space in the air outlet unit;
sintered connecting eyelets each coupled to the corresponding eccentric and
plastic connecting rod shanks coupled to the corresponding connecting eyelet and one of the first working diaphragm and the second working diaphragm, wherein each connecting rod shank is connected to the corresponding connecting eyelet by encapsulating an extension of the connecting eyelet by injection molding.

* * * * *

UNITED STATES PATENT AND TRADEMARK OFFICE
CERTIFICATE OF CORRECTION

PATENT NO. : 8,714,941 B2  
APPLICATION NO. : 13/139394  
DATED : May 6, 2014  
INVENTOR(S) : Rüffer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 375 days.

Signed and Sealed this

Twenty-ninth Day of September, 2015

Michelle K. Lee
*Director of the United States Patent and Trademark Office*